United States Patent [19]

Belisaire

[11] Patent Number: 5,079,883

[45] Date of Patent: * Jan. 14, 1992

[54] BOX INTENDED FOR PASSING PRESSURIZED FLUIDS THROUGH MASONRY WORK

[75] Inventor: Daniel Belisaire, Cesson-Sevigne, France

[73] Assignee: Legris SA, Rennes, France

[*] Notice: The portion of the term of this patent subsequent to Oct. 3, 2006 has been disclaimed.

[21] Appl. No.: 620,444

[22] Filed: Dec. 3, 1990

Related U.S. Application Data

[63] Continuation of Ser. No. 141,727, Jan. 11, 1988, abandoned.

[30] Foreign Application Priority Data

Jan. 12, 1987 [FR] France ............... 87 00306

[51] Int. Cl.⁵ ............................................. E04B 5/48
[52] U.S. Cl. ........................................ 52/220; 52/221
[58] Field of Search ............... 52/220, 221; 285/192; 248/56; 4/DIG. 7; 137/357, 360, 363, 372

[56] References Cited

U.S. PATENT DOCUMENTS

| | | | |
|---|---|---|---|
| 4,683,905 | 8/1987 | Vigneau et al. | 137/360 X |
| 4,844,116 | 7/1989 | Buehler et al. | 137/360 |
| 4,870,792 | 10/1989 | Belisaire | 52/220 X |

FOREIGN PATENT DOCUMENTS

| | | | |
|---|---|---|---|
| 0085329 | 8/1983 | European Pat. Off. | |
| 0191309 | 8/1986 | European Pat. Off. | |
| 1235687 | 3/1967 | Fed. Rep. of Germany | 52/221 |
| 1609204 | 10/1969 | Fed. Rep. of Germany | 52/220 |
| 2319833 | 2/1977 | France | |
| 7523879 | 2/1977 | France | |
| 2528531 | 12/1983 | France | |
| 8210133 | 12/1983 | France | |
| 521033 | 5/1972 | Switzerland | |
| 279301 | 10/1927 | United Kingdom | 52/221 |

Primary Examiner—David A. Scherbel
Assistant Examiner—Lan Mai
Attorney, Agent, or Firm—Oblon, Spivak, McClelland, Maier & Neustadt

[57] ABSTRACT

The invention provides a box for the passage of pressurized liquid through masonry work of small thickness, particularly dividing walls, the box (1), firmly secured to a plastic sheath (4), also embedded in the masonry work (2), allowing plastic material pipes (5) to be installed for pressurized liquids. Said pipe (5) passes through the case and the sheath with radial clearance, which makes it possible to change it for maintenance purposes, the parallelepipedic shaped box having a large opening on which a lid (3) is placed, this lid carrying the connection of the pipe (5) formed by holding means and sealing means.

18 Claims, 8 Drawing Sheets

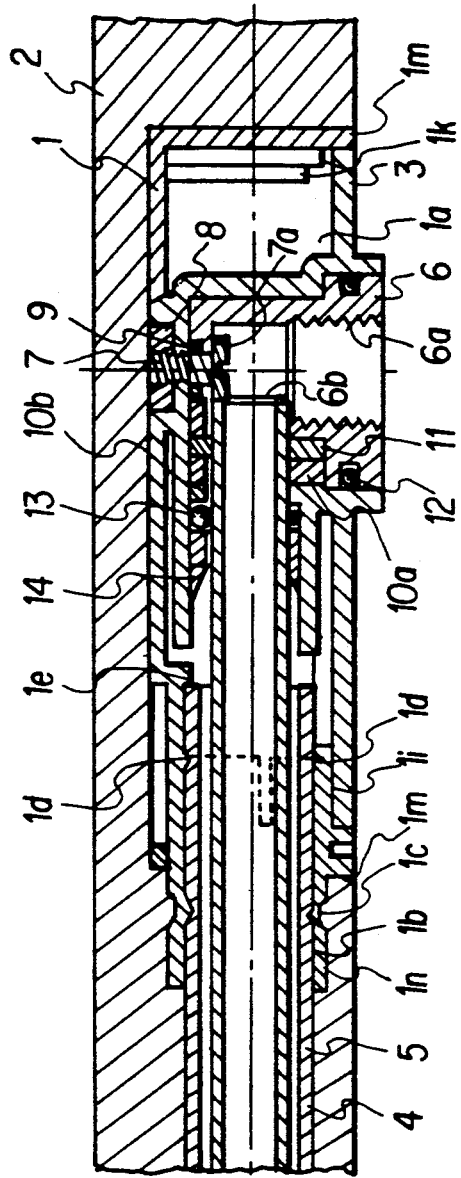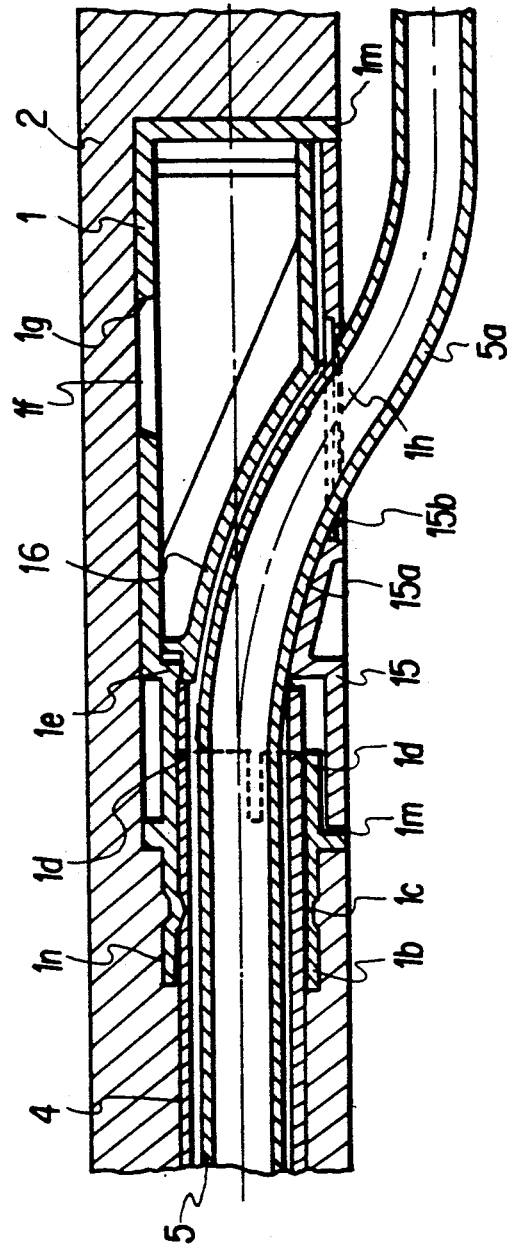
FIG. 1
FIG. 2

BOX INTENDED FOR PASSING PRESSURIZED FLUIDS THROUGH MASONRY WORK

This application is a continuation of application Ser. No. 07,141,727, filed on Jan. 11, 1988, now abandoned.

The invention relates to boxes to be embedded in masonry work and used for facilitating and making inexpensive the passage of plastic tubes for pressurized fluids during the first installation thereof and the future maintenance thereof, the few boxes which exist commercially not really being satisfactory.

In the distribution of sanitary water where plastic pipes are more and more widely used, it is absolutely necessary to pass these pipes through the masonry work.

In fact, these pipes are unaesthetic and are greatly deformed by expansion, and it is therefore necessary to hide them. It is also necessary to be able to pass them once the masonry work is finished, and to be able to change them should a problem arise. Thus it is necessary to slide them through appropriate sheaths ending at each end in boxes embedded in the masonry work. The boxes must hold the sheath firmly while the cement or plastic is cast and withstand the forces to which the equipment is subjected on a construction site.

The field of use of the invention is more particularly the distribution of sanitary water, but it also finds applications in industry, laboratories, agriculture, as well as in the distribution of gases through plastic pipes.

The invention relates to boxes specially designed to be included in masonry work of small thickness, for example dividing walls, or cement slabs of small thickness: between 10 cm and 5 cm. In particular, said boxes may serve as a support for fixing a tap, but also for leading a pressurized plastic pipe out of the masonry work. Very few boxes of this type to be embedded in the masonry work exist commercially and they do not really give satisfaction, for the installation of the boxes and of the pipes is not easy. For this type of box, the American U.S. Pat. No. 4,307,901 may be mentioned.

Nevertheless, the box described has the drawback of having a small sized opening, through which it is difficult to pass the connections and pipes. In addition, it is only designed for the arrival of a pipe and provides solely a metal fitting surface tapped for fixing a tap, but not the possibility of leading a pipe out of the masonry work.

The boxes of the invention are designed for passing a single pipe through masonry work of a thickness of 5 to 10 cm. They do not have the drawbacks of commercial cases and satisfy the following conditions:

The present invention relates more particularly to a box for passing pressurized fluids through masonry work of small thickness, more particularly dividing walls, said box being formed of a hollow plastic material case embedded in the masonry work, and firmly connected to plastic sheaths also embedded in the masonry work, for installing a plastic material pipe conveying pressurized liquids, said pipe passing through the case and the sheaths with radial clearance so that it is possible to replace it during maintenance. The box is characterized in that it has a smooth rectangular top flush with the masonry work and a general parallelepipedic shape in which a cylindrical pipe of small length receives a rigid plastic material tubular sheath embedded in the dividing wall and fixed with the box by sealed engagement teeth in the liquid plaster and cement by means of a collar gripping the pipe. The box is recessed substantially totally, sufficiently for it to be simple to pass the tube therethrough and so that this latter may cooperate with removable connection means adapted for being integrated inside said box.

The advantages, functions, ease of use and progress obtained by the boxes of the invention will be better understood from the following drawings, in which FIG. 1 is a sectional view of a box of the invention, embedded in the masonry work, at which a pressurized pipe arrives, and having means for connection to a tap, FIG. 2 is a sectional view of the same box, embedded in the masonry work, but equipped with a lid and a box bottom for leading out a pressurized pipe parallel to the masonry work, FIG. 3 is identical to FIG. 2 but the pressurized pipe is led out perpendicularly to the masonry work, FIG. 4 is a sectional view of a box embedded in the masonry work, whose lid has been removed for facilitating installation of the pressurized pipe, FIG. 5 shows the installation of the lid of FIG. 1 on the end of the pressurized pipe, FIG. 6 shows the box of FIGS. 1 and 2 without a lid, and a manner of sliding the box bottom behind the pressurized pipe, FIG. 7 is a sectional view of the lid of FIGS. 2 and 3, in which a portion has been punched so as to form an opening for passing the pressurized pipe, FIG. 8 is a view of a box assembly, such as the one shown in FIGS. 2 and 3, embedded in the masonry work, FIG. 9 is the sectional view of the box of FIG. 1, complete and ready to be embedded in the masonry work, FIG. 10 is a sectional view of a box cast in the masonry work without a lid, FIG. 11 is a sectional view of a lid, such as that shown in FIG. 1, complete and ready to be mounted on a box, FIG. 12 is a sectional view of the lid of FIG. 8, FIG. 13 is a sectional view of the box bottom of FIGS. 2, 3 and 8, FIG. 14 shows in section the means for locking and sealing a pipe to the lid of FIGS. 1, 5 and 11, FIG. 15 shows a variant of the lid of FIGS. 1, 5 and 11, FIG. 16 is a top view of a means for fixing the pressurized pipe irreversibly in a box, FIG. 17 is a top view of a parallelepipedic seal providing sealing with the pressurized pipe;

Figure 11:
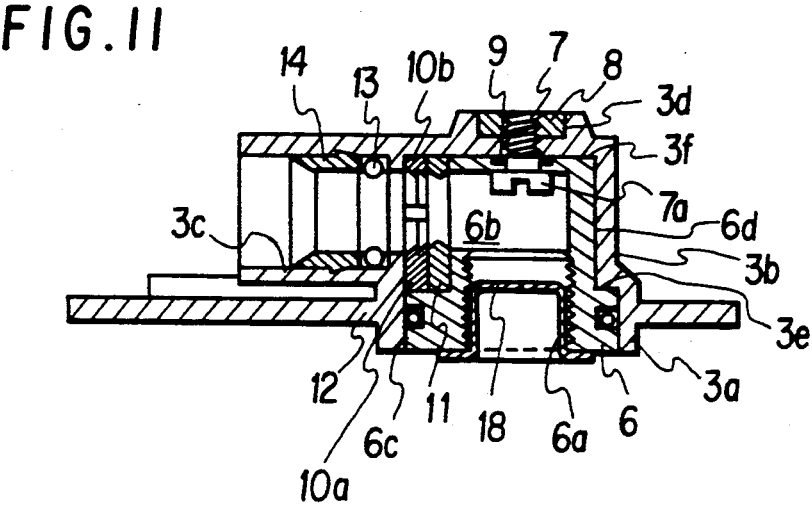

Box 1 of FIG. 1 is embedded in masonry work 2, with a sheath 4, a pressurized pipe 5, and a lid 3, shown only in FIG. 11. Pipe 5 is secured to lid 3 of box 1.

Figure 3:
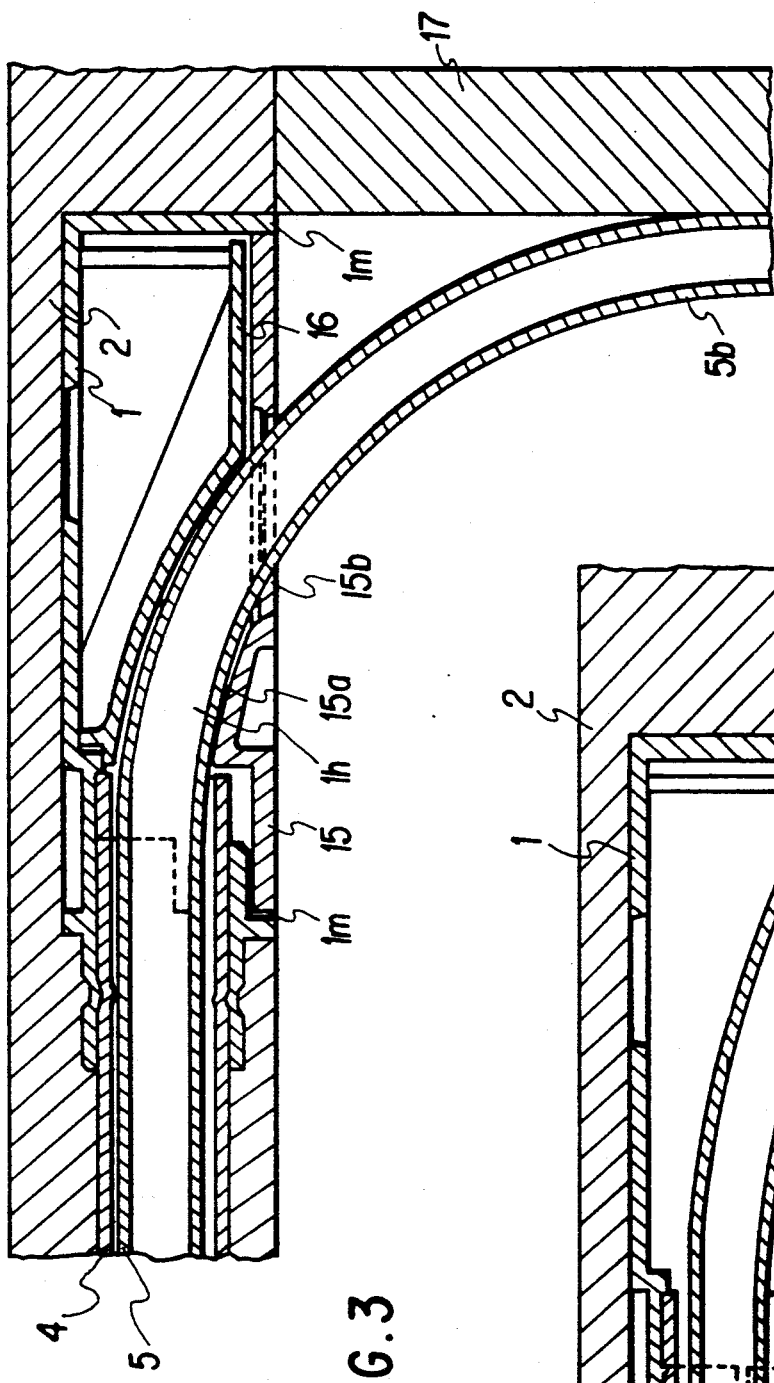

In one embodiment, in FIGS. 2 and 3, pipe 5 passes through the box 1 and leaves directly through a lid 15.

Figure 24:
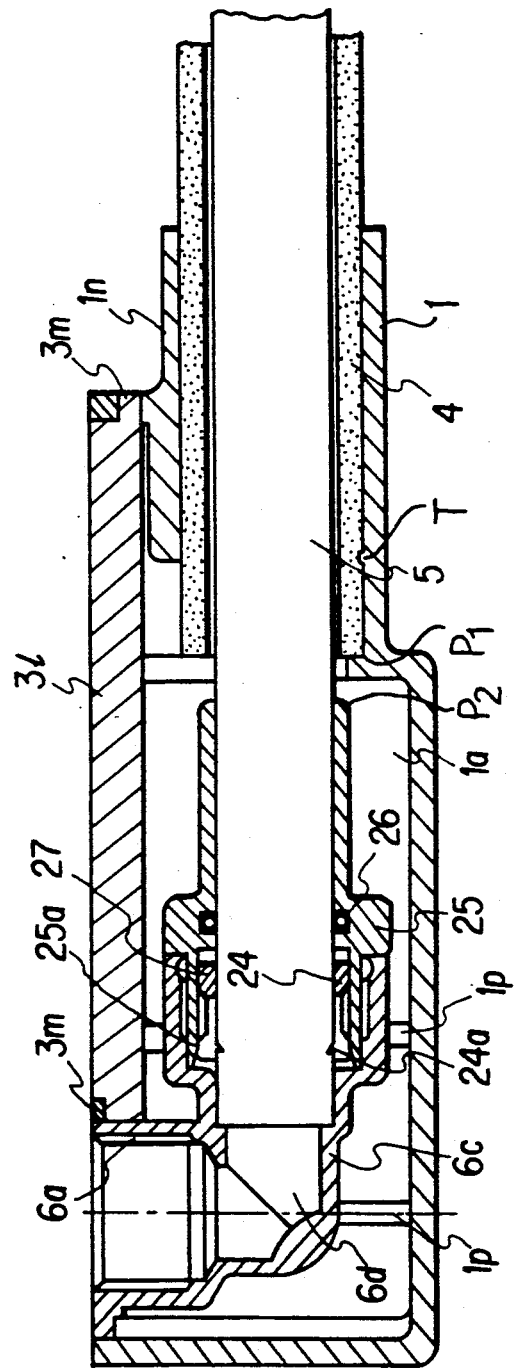
FIG. 24 is a sectional view of a box provided for an orthogonal connection piece, with a quick connection system.

In another embodiment, in FIG. 24, pipe 5 is connected to an instantaneous connection 27 fixed to box 1 which is provided, in this case, with a closure lid 3e.

Box 1 has a smooth rectangular top 1m flush with the thin masonry work 2. It has a general parallelepipedic shape, a short cylindrical pipe 1n of which has received a sheath 4 in the form of a thick plastic material tube buried in the dividing wall. Sheath 4 is fixed to box 1 by engagement teeth 1d, one of which is fixed at the bottom of the box and the other slightly movable by resilience. This makes possible a complete and definitive fixing of the sheath on the box thus secured together. The sheath is sealed with respect to the liquid cement or plaster by the collar 1c which exerts a slight clamping force on the sheath, thus guaranteeing such sealing. Box 1 is recessed as a whole to form the housing 1a. The dimensions of the box, its length in particular, are sufficient for readily passing the pipe therethrough during fitting on lid 3. Box 1 of FIG. 1 is equipped with the lid receiving a pipe end which is firmly held and sealed. The complete box with its lid 3 provides the tapped fitting surface 6a for firmly fixing a standard commercial tap. Lid 3 has a removable metal piece 6 which, clamped by a screw 7 screwed into a nut 8, compresses holding pieces 10 and 10b, provided with pointed teeth, against pipe 6, thus ensuring perfect holding of this tube. Such clamping is calculated and limited. It is impossible to clamp the pipe too tightly.

Figure 14:
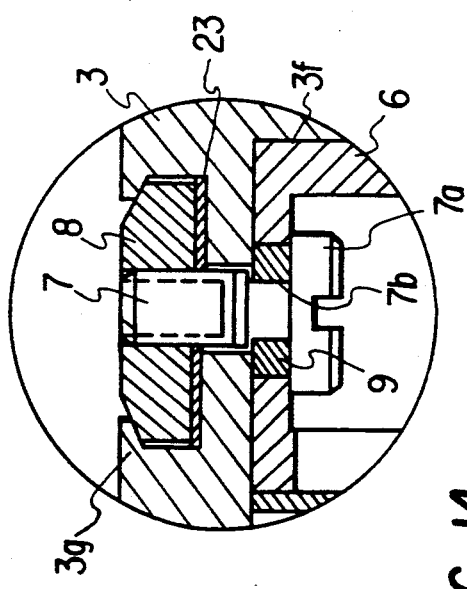

By the same screw 7 acting on piece 6, seal 11 of pipe 5 is compressed in a closed space, consequently providing perfect and durable sealing. Thus, knowing that piece 6 is a robust metal piece and that lid 3 is made from a high quality plastic material, it can be seen that the liquid is never in contact with the box. Sealing is doubled at all the possible outlets of leaks. On pipe 5, a seal 13 provides double sealing. Under nut 8, a seal 23, visible in FIG. 14, is positioned and boxed under high compression, doubling the sealing of an O seal 9 already positioned on the screw. On piece 6 an O seal 12 provides double sealing in addition to seal 11. Thus, it can be seen that the system guarantees double sealing at all the possible leak outlets. The seals may be changed periodically or as required. It is noted that the holding pieces 10a, 10b and seal 11 are boxed by piece 6 acting on tube 5, in a completely closed space, by compression by means of a single fixing screw 7. Piece 6 forms a right-angled channel 6b. This system is extremely practical and an ordinary screw driver is sufficient for fitting or removing a plastic material pressurized supply pipe. Screw 7 and nut 8 are made from a very hard material, making intense clamping possible, without any risk of breakage of one of these two elements.

One of the remarkable functions of screw 7 is that the head of this screw 7a serves as a stop for pipe 5, which can be clearly seen by the installer through the tapped hole 10a. Thus the installer will only lock this screw 7 when he looks through the tapped hole 10a and confirms that pipe 5 is in abutment against the screw head 7a. This precaution guarantees perfect fitting of the pipe. It is very easy to check the correct installation. It can also be seen that pipe 5 is guided in piece 3 by a guide tube 14 having a tapered inlet which greatly facilitates the insertion of said pipe.

One of the features of the invention is that this box is made for the reception or the passage of a single pressurized pipe. It is then compact and may be housed anywhere, in all masonry work of small thickness, of the order of 5 to 10 cm. It can also be seen that the lid 3 on this box is perfectly fitted into box 1, perfectly flush with the surface of the box 1m and also with the masonry work 2. Lid 3 is firmly fixed by several screws in the corners of the parallelepiped of body 1. These screws have not been shown in the drawings, but it is a question of standardized countersunk screws, flush with the face 1m of the box. Lid 3 rests through solid bearing surfaces 1i and 1k on box 1.

An important feature of the box shown in FIG. 1 is the possibility of removing pipe 5 and changing it without removing lid 3, in the following way: first of all screw 7 is unscrewed about three turns. This results in releasing piece 6 and decompressing the engagement pieces 10a and 10b and seal 11. Pipe 5 is thus freed and it may be withdrawn at its end. Then, a new pipe is fitted which, guided by sheath 4, arrives and is automatically centered in the guide tube 14. Then, with the pipe pushed energetically through the seal 13, the holding pieces 10a and 10b, and seal 11, it finally abuts against the screw head 7a. When the installer has noticed that pipe 5 is in abutment against the screw 7a, the fitting is finished and it only remains to lock screw 7. This results in reclamping and gripping the tube by the holding jaws 10a and 10b and in locking the screw 11 energetically in a closed box relation. Thus, the passage of a pipe 5 is very simple and very rapid to carry out. No prior system, with copper tubes, can allow such rapid maintenance and changing of a pipe.

A feature of the maintenance and general removal of the seals is an important point of the invention. That occurs in the following way, without removing lid 3 which may obviously be covered with tiles or carpeting:

Unscrew screw 7 completely. Pipe 5, may, by its other end be drawn axially by 2 or 3 cm (that is always possible). Then piece 6 may be removed, all the seals 9, 11, 12 and 13 are replaced by new seals. The pieces are then replaced without locking screw 7. Pipe 5 is pushed back into the connection until it abuts against the screw head 7a. Now, it is perfectly refitted. It is then sufficient to retighten screw 7 energetically, for fixing the sealing pipe 5. Thus the rapid maintenance of all the joints has been carried out without difficulty. This maintenance may be carried out at specified times. Whatever the case may be, it is possible to do it in the case of need or emergency.

In FIG. 1 it can also be seen that sheath 4 is fitted as far as a stop prepared in the box 1e. The sheath is thus fitted as far as possible, so that it is as close as possible to lid 3 forming therewith a substantially continuous duct which serves for guiding pipe 5.

Figure 12:
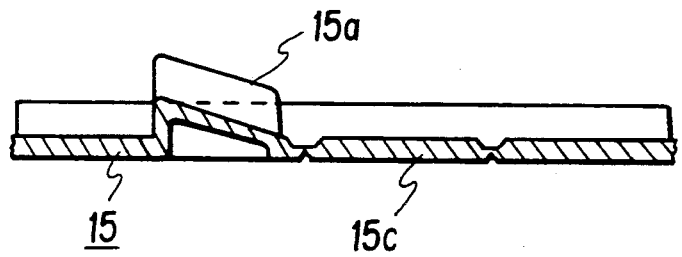
Figure 13:
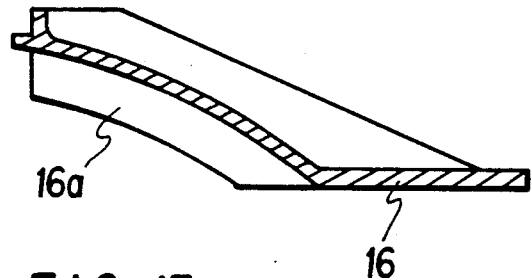

FIG. 2 shows a box 1 embedded in masonry 2, complete and equipped with a lid 15, FIG. 12, and a box bottom 16, FIG. 13, so as to form a sort of tube through the box and allow pipe 5 to come parallel to the dividing wall 2 at 5a and thus extend to any appliance outside this dividing wall. Conversely, a pipe 5 parallel to a dividing wall 5a enters through masonry work to leave at the other end of this masonry work, in which it has been neatly hidden. Box 1 is exactly the same as that of FIG. 1, another lid 15 and a box bottom 16 are mounted thereon. Pipe 5 passes through lid 15 through an aperture 15b and then extends along the masonry work 2. This makes it possible to hide pipe 5 in a part of the masonry work and to lead out it of this masonry work either to go to an appliance or to any connection.

Figure 4:
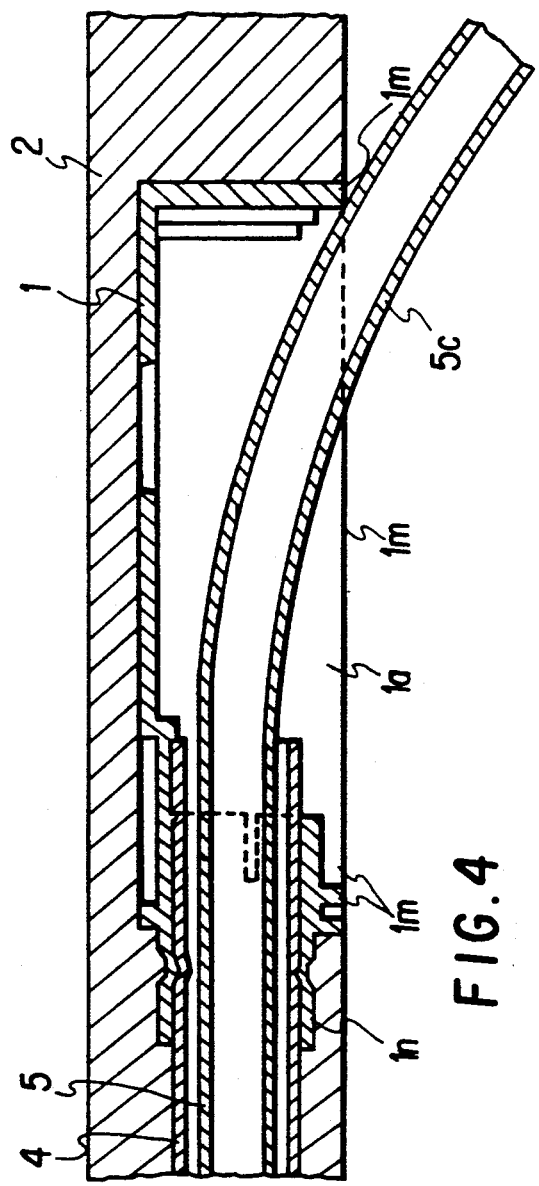
Figure 6:
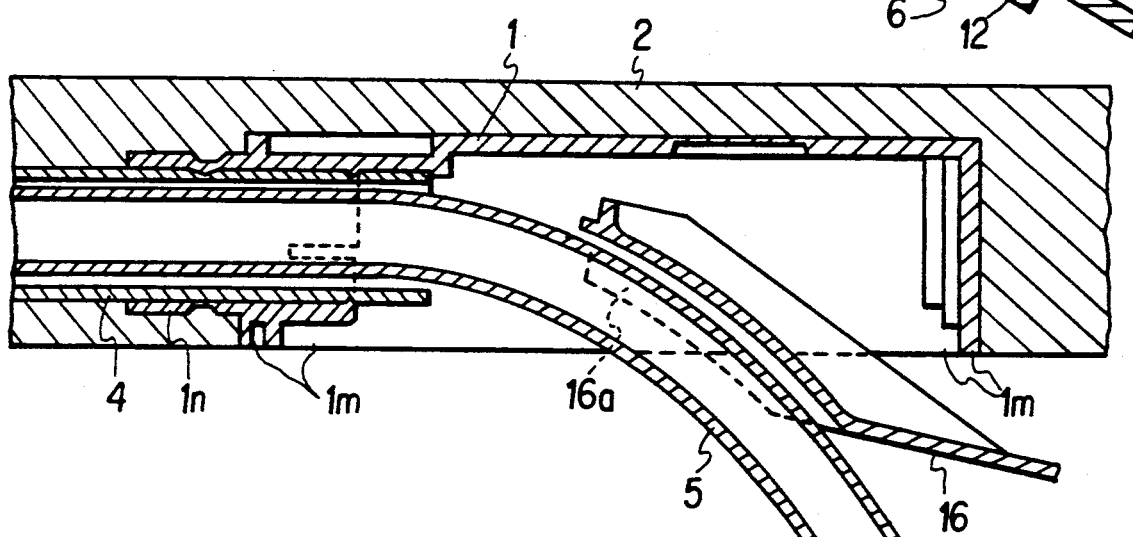
Figure 7:
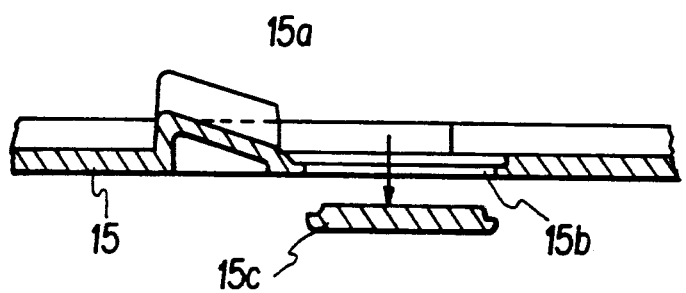

Another feature consists in the fitting of pipes which allows them to pass through the box and to leave the masonry work in the following way. When the box has been embedded in the masonry work, the lid 15 and the box bottom 16 are removed. Thus an open box is obtained, FIG. 10, and two detached pieces 15 and 16, FIGS. 12 and 13. Then, pipe 5 is readily slid into sheath 4 as can be seen in FIG. 4. The wide opening 1a of the box makes it possible to pass the pipe through with a large curvature, without causing it to bend too much. Then, pipe 5 is slightly curved so as to be able to slide behind the box bottom 16 as can be seen in FIG. 6. Then a portion 15c is punched which is separated from lid 15, as can be seen in FIG. 7, and the lid is replaced. Thus the assembly of FIG. 2 is obtained. It should be noted that lid 15 is firmly fixed with several screws in the corners of the parallelepipedic box 1. These screws have not been shown. Finally pipe 5 is curved at 5a parallel to the masonry work 2.

Another important feature is that it is possible to change pipe 5 passing through the box without removing the lid 15 or the box bottom 16, in the following way: pipe 5 is slid axially in the bent tube guide 1h formed by pieces 15 and 16 assembled together, it is removed and a new one is slid in. The radial clearance provided between pipe 5 and sheath 4 and between guide 1h and the passage hole 15b in the lid makes this pipe changing operation possible. This is therefore important, even if the lid of the box was covered by tiling or carpetting.

Another important feature is that, if the lid 15 has not been covered with carpeting, paint or tiling, it may be simply unscrewed and the box bottom 16 removed. For changing pipe 5 we have then the same situation as in FIG. 4, in which passage of the pipe is greatly facilitated. After changing pipe 5 by a new pipe, the assembly of pieces 15 and 16 are fitted together again, as was explained above.

In FIG. 3, at the outlet of pipe 5 through the hole 15b in lid 15, the pipe 5 is curved at 5b, that is to say perpendicularly to the masonry work 2 and parallel to the masonry work 17.

Thus, with this system of passing the pipe through the box, we have the possibility of leading it out either parallel or perpendicularly to the masonry work 2.

FIG. 4 shows a box 1 buried in the masonry work 2, whose lids have been removed so as to show the wide opening 1a giving access to the box of the invention. An important feature of the invention can also be seen here, in which the pipe is fitted through a wide opening 1a in case 1. In fact, pipe 5 is mounted in the box and leaves with wide curvature 5c, so that its axial passage through masonry work 2 and sheath 4 is readily obtained with low stresses. This feature is important since the commercially available boxes of the same size do not have this important advantage of the facility of passing the pipe with small curvature stresses 5c.

Figure 5:
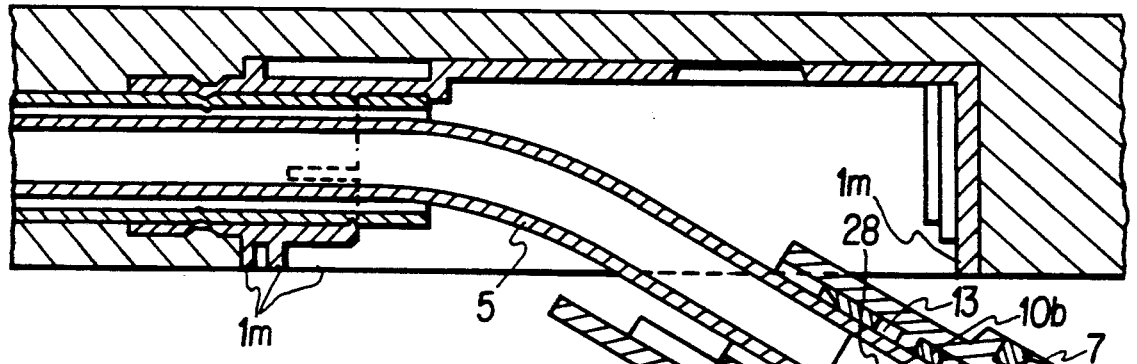

FIG. 5 shows the way in which pipe 5, which has been led out from the masonry work at 5c, is fixed very conveniently outside the masonry work to the lid 3 and to its connection assembly formed by pipes 10a, 10b, 11, 6 and screw 7. As was mentioned above, the fitting takes place as follows: unscrew screw 7 about three turns. Thus jaws 10a and 10b are unlocked, piece 6 having been able to be moved back, and seal 11 is unclamped. It is thus possible to fit the pipe 5 inside the housing of lid 3, until it abuts against the screw head 7a. Then, it is sufficient to drive screw 7 home so as to position piece 6 and thus cause compression of the engagement pieces 10a and 10b on the pipe and also that of seal 11 in a completely closed box relation. Thus perfect holding and sealing are obtained. Checking the abutment of the pipe against head 7a is an important feature of the invention. Pipe 5 may have an optional support sleeve 28 which will be positioned before it is fitted into lid 3. The operations which we have just described are greatly facilitated by a very good manual grip of pipe 5 and lid 3. The fitting is terminated by sliding pipe 5 in sheath 4, then replacing lid 3 and locking it on box 1 by the fixing screws (not shown).

In FIG. 6, pipe 5 has been passed through the masonry work and sheath 4 as in FIG. 4, and the box bottom 16 with its guide 16 is being installed behind pipe 5. One of the important features of the invention is the way in which the parts are then positioned. Pipe 5 is bent over a reduced curvature and the box bottom 16 with its guide 16a is slipped therebehind. It is positioned at the bottom of box 1, on the complementary parts disposed for this purpose, as can be seen in the final fitted position in FIG. 2.

FIG. 7 shows the way of preparing lid 15 by punching the portion 15c precut out in the plastic so as to obtain the aperture 15b through which the pipe 5 will leave box 1. Box profile 15a conforms to the curvature of box bottom 16.

Figure 8:
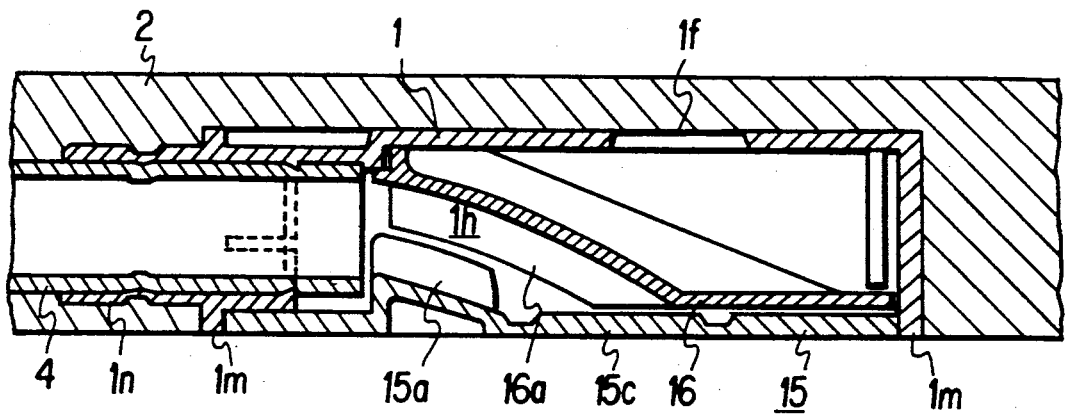

In FIG. 8, a box 1 of the invention, equipped with its pieces 15 and 16, is embedded in the masonry work 2. According to an important feature of the invention, which can be seen in FIG. 8, the smooth surface 15 is perfectly smooth, without any projecting part, and flush with the masonry work 2. Thus it is easy to construct masonry work without having any projecting part, which is an important advantage for the period when the masons are working in the building. It is also important to notice that lid 15 and piece 16 may, after sealing, be removed and replaced by a lid 3 which has a part projecting slightly from the masonry work. Thus, the box 1 could have been embedded and sealed in the masonry work and lid 3 only placed once the pipes and plumbing have been fitted.

Figure 9:
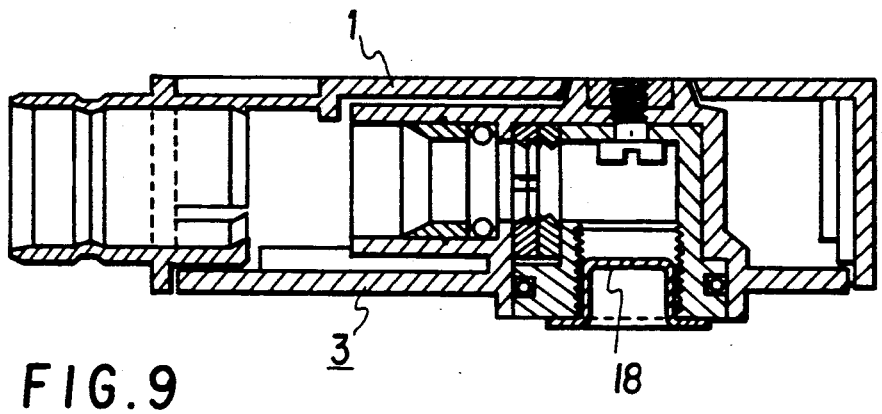

FIG. 9 shows a box of the invention ready to be embedded in masonry work, and having a protection capsule 18 required during sealing of box 1.

Figure 10:
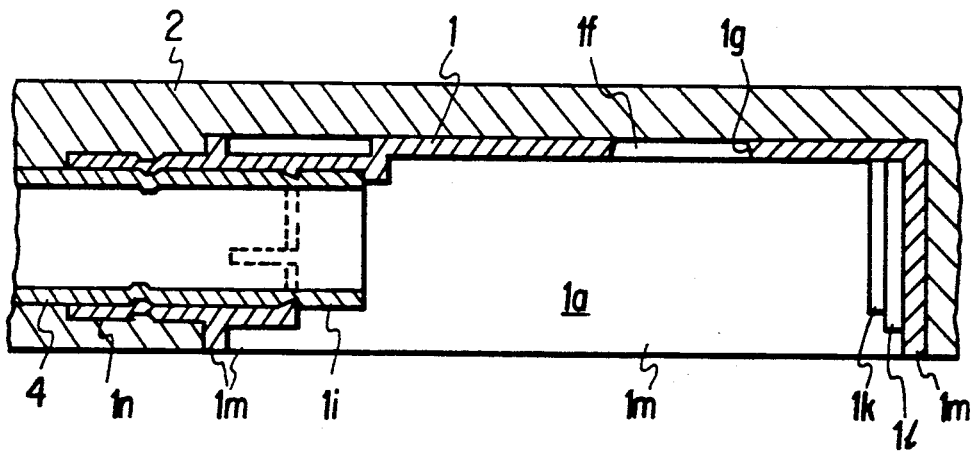

FIG. 10 shows a box 1 which, having been embedded in the masonry work 2, has had its lid removed. Thus, the great recess 1a of the box, the surface 1m which is flush with the masonry work 2 and the bearing surfaces 1i, 1k and 1e reserved for supporting the internal pieces, such as lid 3 or lid 15 and the box bottom 16 can be appreciated. It can also be seen that with the lid removed practically the whole of the box is freed.

Figure 15:
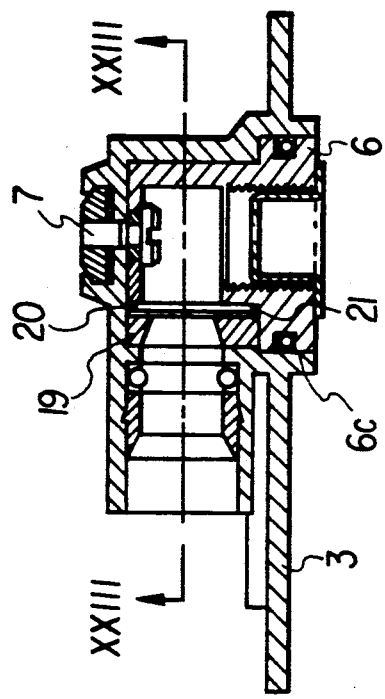
Figure 21:
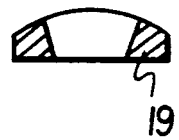
FIG. 21 shows the section of a rectangular surface seal but with curved bottom
Figure 22:
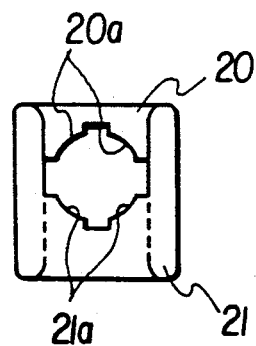
FIG. 22 is a top view of two thin stamped pieces, working in opposition, sliding one on the other for holding a pressurized pipe by compressing it.

In FIG. 15, which shows a variant in section of the system for sealing and holding lid 3, the pressurized pipe is held by two thin stamped plates 20 and 21, FIG. 22 which are pushed together, thus locking the pipe by their edges 22a which penetrate into the tube, holding it perfectly in position. A seal 19 can also be seen which is also visible in FIGS. 21 and 23.

Figure 16:
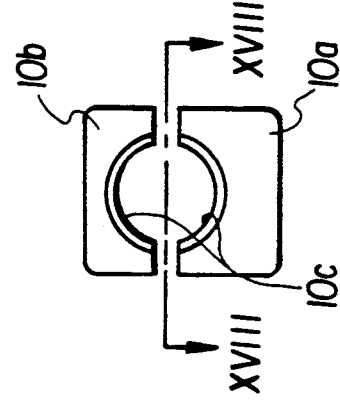
Figure 18:
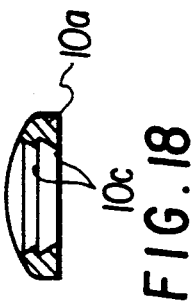
FIG. 18 is a sectional view through line A-B of FIG. 16.

The two jaws 10a and 10b have sharp edges 10c FIG. 16, which, by tightening screw 7 and by the pressure of piece 6, clamp the tube and impress their edges 10c thereon, holding it perfectly in position. These edges can be seen in FIG. 18.

Figure 17:
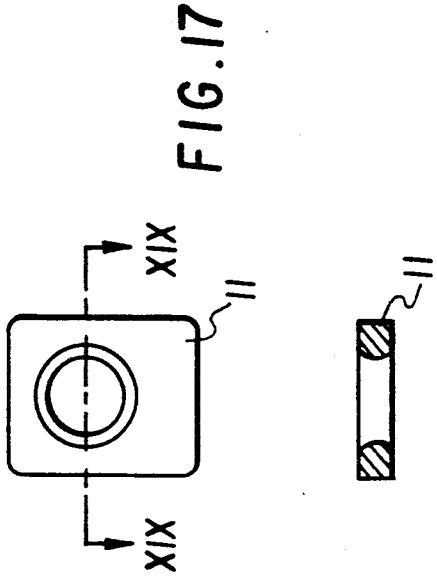
Figure 19:
FIG. 19 is a sectional view through line C-D of FIG. 17.
Figure 20:
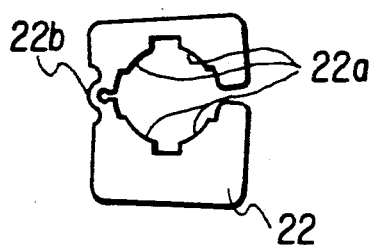
FIG. 20 is a top view of a piece for holding a pressurized pipe by clamping it.

The seal 11 has a parallelepipedic shape, FIGS. 17. It is pierced with a hole of radiating shape, as can be seen in FIG. 19.

Figure 23:
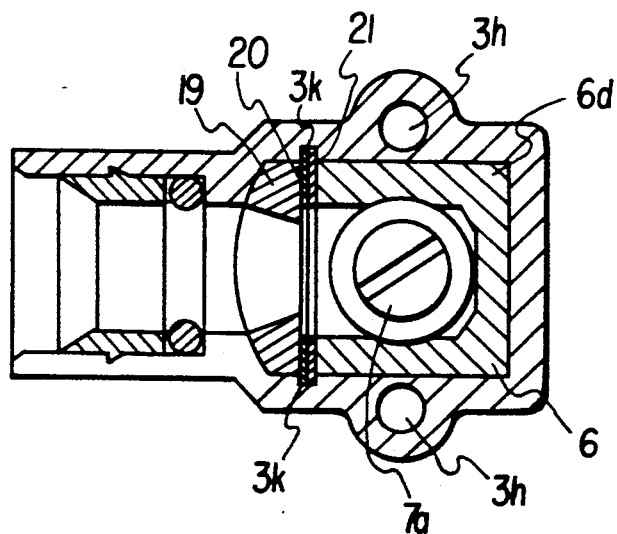
FIG. 23 is a sectional view through line E-F of FIG. 15.

FIG. 23 shows the forms of the seal 19 and of pieces 20 and 21 sliding in two grooves 3k in lid 3; an important feature of the invention can also be seen, in which piece 6 has a square part which mates with a complementary shape of lid 3. This square part 16 provides locking against any rotational movement exerted on piece 6 and, in particular, allows taps to be positioned and screwed into the threaded portion 6a shown in FIG. 11. The screw heads 7a can also be seen at the bottom of piece 6.

In FIG. 24, in box 1 is fixed a right angled connection bearing on boxes 1p. Its internal orthogonal duct 16 has, at one of its ends, a hollow threaded means 6a for connection to sanitary fittings and appliances (not shown) and, at its other end, members and fittings required for guiding, sealing and holding pipe 5 in position on its external wall, through a split resilient grip 24 with multiple teeth 24a locked by a cone 25a of a guide member 25 which receives an annular seal 26 providing sealing of pipe 5 on its outer diameter. As shown in FIG. 4, sheath 4 is fixed to a cylindrical portion of box 1 by means of engagement teeth T. The sheath 4 penetrates into box 1 up to an abutment $P_1$. The abutment $P_1$ is located near the end portion $P_2$ of guide member 25 of the instantaneous connection system. The arrangement of abutment $P_1$ and end portion $P_2$ of guide member 25 allow pipe 5 to be easily guided into the connection system 27. This instantaneous connection system 27 is described in French patents no 2 319833 and 2528531. Sheath 4 is held fixed in box 1 as in FIGS. 1, 2, 3 etc; lid 31, fixed on box 1 by snap fit engagement means 3m, 3n, provides sealed closure of the box, avoiding any introduction of masonry products inside the cavity 1a.

It is a very important feature of the invention that the boxes may have different lids carrying systems, either inlet for the pipe, or crossing of the pipe depending on the needs of the installer. In addition, the embedded boxes may receive different lids, for receiving and fixing different pipes, or for passing pipes of different diameters. This gives a further flexibility in use. In fact, in the sanitary field in particular, several plastic pipe dimensions are used. In another system, lids may be provided on which the connection systems are independent and, in this case, said lids have no relation with the fixing of the connecting pipe.

Since the boxes of the invention are molded into the masonry work with their connecting sheath, it is only at the normal finishing stage of the plumbing that the hot and cold water sanitary network will be passed with an appreciable saving in time with respect to conventional metal pipe plumbing. The costs of installing the sanitary works are very greatly reduced, practically by a half, by saving in material, plastic material instead of copper, and the enormous saving in time in installing pipes fitted by cheap unspecialized labour. These plastic pipe installations do not require welders since there is no welding.

I claim:

1. An apparatus for passing pressurized fluids through a masonry fixture, comprising:
    a hollow plastic box having a parallelepipedic shaped embedded in the masonry fixture, said plastic box having a smooth rectangular top flush with said masonry fixture;
    a plastic sheath embedded in said masonry fixture;
    a plastic pipe for conveying pressurized liquids, said pipe passing through said box and said sheath with radial clearance;
    said plastic box having a cylindrical pipe which engages said sheath by means of engagement teeth; and
    means for sealing said pipe from said masonry fixture and exerting a clamping force on said pipe.

2. An apparatus according to claim 1, further comprising:
    a lid having holding means for holding said pipe;
    pressure sealing means for forming double sealing on said pipe;
    said lid having a removable metal piece;
    a screw screwed into a nut secures said metal piece and compresses said holding means; and
    metal piece sealing means for sealing said metal piece.

3. An apparatus according to claim 2, wherein:
    said metal piece is held by means of said screw whose head serves as a top for said pipe and facilitates positioning thereof.

4. An apparatus according to claim 2, wherein:
    said holding means and said pressure sealing means of said pipe are held in position and tightly clamped on said pipe by said screw.

5. An apparatus according to claim 2, wherein:
    said holding means comprises a single-resilient-stamped-thin metal piece having four engagement sectors for engaging the pipe said engagement sectors being locked by a clamping effect caused by said screw on said metal piece.

6. An apparatus according to claim 5, wherein:
    said metal piece has a cylindrical part and a first square part interfaced with a square part of said lid, said first square part securely locking said metal piece.

7. An apparatus according to claim 1, further comprising:
    said hollow plastic box having a box bottom;
    an alternative lid forming a hollow curved channel with said box bottom;
    a circular section of said box serves as a guide for said pipe through said channel;
    said alternative lid having an aperture; and
    said pipe exits said channel through said aperture.

8. An apparatus according to claim 7, wherein:
    said alternative lid comprises a cover and a box profile which conforms to the curvature of said box bottom.

9. An apparatus according to claim 8, wherein:
    said cover is punched out so as to allow the pipe to pass therethrough.

10. An apparatus according to claim 8, wherein:
    said alternative lid may be replaced by said lid for fitting said pipe.

11. An apparatus according to claim 1, wherein an instantaneous connection system connects said pipe to an inside location of the box, said instantaneous connection system comprising:
    a split grip; and
    a guide member having a cone interconnected to an annular seal which seals the exterior of said pipe, said cone locking said split grip to said pipe.

12. An apparatus as in any one of claims 2, 11, 3 or 4, wherein:
    said metal piece has a tapped fitting surface for fitting a tap.

13. An apparatus according to claim 12, wherein:
    said pressure sealing means comprises a seal for sealing the pipe, said seal being located between the lid and the metal piece.

14. An apparatus according to claim 13, wherein:
said holding means comprises two thin-stamped metal plates which are slid into grooves in said lid, said grooves being located between said metal piece and a shaped seal.

15. An apparatus according to claim 14, wherein:
said two thin-shaped metal plates have engagement sectors which clamp the pipe when said screw is tightened on the metal piece.

16. An apparatus according to claim 11, further comprising:
an abutment connected to said sheath for preventing further penetration of the sheath into said box.

17. An apparatus according to claim 11, wherein said box surrounds said plastic sheath.

18. An apparatus according to claim 1, wherein:
said masonry fixture has a thickness of 5 to 10 cm.

* * * * *